US008179815B2

(12) United States Patent
Rudland et al.

(10) Patent No.: US 8,179,815 B2
(45) Date of Patent: May 15, 2012

(54) GATHERING AND REPORTING DATA CONCERNING COMMUNICATION CHANNEL CONDITIONS FOR A WIRELESS DEVICE IN A WIRELESS NETWORK

(75) Inventors: Philip Andrew Rudland, Horley (GB); Immo Benjes, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 129 days.

(21) Appl. No.: 12/522,715

(22) PCT Filed: Jan. 24, 2008

(86) PCT No.: PCT/IB2008/050257

§ 371 (c)(1), (2), (4) Date: Jul. 10, 2009

(87) PCT Pub. No.: WO2008/090524

PCT Pub. Date: Jul. 31, 2008

(65) Prior Publication Data

US 2010/0054146 A1 Mar. 4, 2010

Related U.S. Application Data

(60) Provisional application No. 60/886,419, filed on Jan. 24, 2007.

(51) Int. Cl.
*G01R 31/08* (2006.01)

(52) U.S. Cl. ...................... 370/252; 370/345; 455/67.11

(58) Field of Classification Search .................. 370/252, 370/328, 310, 329, 332, 333, 338, 230, 235, 370/395.21, 465, 253, 345; 455/561, 522, 455/562.1, 67.11, 403
See application file for complete search history.

(56) References Cited

U.S. PATENT DOCUMENTS

| | | | | |
|---|---|---|---|---|
| 6,445,917 | B1 * | 9/2002 | Bark et al. | 455/423 |
| 6,958,982 | B2 * | 10/2005 | Rudolf et al. | 370/328 |
| 7,620,063 | B2 * | 11/2009 | Cave et al. | 370/445 |
| 2005/0009565 | A1 * | 1/2005 | Kwak | 455/561 |
| 2005/0266803 | A1 * | 12/2005 | Dinur et al. | 455/67.11 |
| 2007/0270121 | A1 * | 11/2007 | Shao et al. | 455/403 |
| 2008/0259811 | A1 * | 10/2008 | Cordeiro et al. | 370/252 |

FOREIGN PATENT DOCUMENTS

WO 03001742 A1 1/2003

OTHER PUBLICATIONS

Zhi Tian et al., "Weighted energy detection of ultra-wideband signals", Signal processing advances in wireless communications, 2005, pp. 1068-1072, New York.

Anonymous, IEEE Standard 802.15.4-2003: Part 15.4: Wireless medium access control (MAC) and Physical Layer (PHY) Specifications for Low-Rate wireless personal area networks (LR-WPANS), 2003.

Anonymous, IEEE 802.15.4-2006 Part 15.4Wireless medium access control (MAC) and Physical Layer (PHY) Specifications for Low-Rate wireless personal area networks (LR-WPANS), 2006.

* cited by examiner

*Primary Examiner* — Kwang B Yao
*Assistant Examiner* — Vincelas Louis

(57) ABSTRACT

A device for wireless communication with at least one node in a wireless network is configured to obtain statistical data regarding one or more selected communication channels over which the device is adapted to communicate. The, device is further configured to report to at least one other device at least one metric related to an availability of each of the one or more selected communications channels for communications.

56 Claims, 3 Drawing Sheets

GATHERING AND REPORTING DATA CONCERNING COMMUNICATION CHANNEL CONDITIONS FOR A WIRELESS DEVICE IN A WIRELESS NETWORK

TECHNICAL FIELD

This invention pertains to wireless devices and wireless networks, and more specifically to gathering data about the conditions of communication channels for a wireless device, and reporting the data to a wireless network.

BACKGROUND AND SUMMARY

Wireless networks are increasingly commonly employed to provide enhanced capabilities for a variety of devices. One category of wireless networks is a wireless Personal Area Network (PAN). One suitable format for communications in a wireless PAN is described by the ZigBee Specification for low cost, low power wireless radio links, as defined by the ZigBee Alliance. ZigBee wireless PANs are especially suitable for use, for example, in home automation networks for controlling lights, security systems, fire alarms, heating-ventilation-and-air-conditioning (HVAC) systems, etc.

FIG. 1 shows one exemplary embodiment of a wireless network 100 including a plurality of wireless devices 120. Wireless network 100 may be a ZigBee wireless PAN. In the wireless network 100, wireless devices 120 are classified into three different categories: PAN Coordinator 120*a*, Routers 120*b*, and End Devices 120*c*. In the context of a ZigBee wireless PAN, each of these wireless devices is also sometimes referred to as a "node."

Each ZigBee wireless network includes a PAN Coordinator 120*a*. PAN Coordinator 120*a* is the ZigBee device responsible for starting the formation of the wireless network 100. PAN Coordinator 120*a* is able to store information about the wireless network 100 (e.g., security keys). PAN Coordinator 120*a* chooses the PAN ID, and conventionally has a ZigBee address of 0.

Wireless network 100 may include a plurality of Routers 120*b*. Router 120*b* has the capability to pass data from one wireless device 120 to another wireless device 120, and may also act as a source and destination for data communications.

In contrast, End Device 120*c* includes just enough functionality to communicate with its "parent node"—which may be either a Router 120*b* or PAN Coordinator 120*a*. End Device 120*c* cannot directly pass messages between two other wireless devices 120. Accordingly, End Device 120*c* requires the least amount of memory and therefore in general can be manufactured at a lower cost than PAN Coordinator 120*a* or Router 120*b*.

In a ZigBee wireless PAN, communication between nodes 120 takes place over one of a number of "physical channels." ZigBee wireless PANs and wireless devices employ functionality described in IEEE Standard 802.15.4-2003. IEEE 802.15.4-2003 has two physical (PHY) layers that operate in respective upper and lower frequency ranges: 868/915 MHz and 2.4 GHz. The lower frequency PHY layer covers both the 868 MHz European band and the 915 MHz band, used in countries such as the United States and Australia. The higher frequency PHY layer is used virtually worldwide.

The 2.4 GHz communications band contains 16 separate IEEE 802.15.4 channels, so a number of ZigBee wireless PANs can operate simultaneously, with each operating on its own channel(s) and thereby not interfere with each other. It is possible for more than one ZigBee wireless PAN to use a single channel, especially if they are separated by a long distance (>10-100 m away), or if both have fairly low usage rates (low duty cycle).

Other devices (e.g., so-called "WiFi" devices) also operate in the 2.4 GHz band, and WiFi traffic can interfere with ZigBee traffic. WiFi messages can be transmitted at a much higher power level than ZigBee messages, and a WiFi channel is as wide in bandwidth as several ZigBee channels. In order for two such systems to coexist it is beneficial to be able to work out which channels are clear, and to get the interfered-with network (e.g. the ZigBee wireless PAN) to operate on these clear channels.

Toward this end, the ZigBee specification provides a mechanism whereby a PAN Coordinator can instruct another wireless device to carry out an "energy detection scan" (ED scan) for one or more communication channels. IEEE Standard 802.15.4-2003 section 6.7.7 specifies that an ED measurement is an estimate of the received signal power within the bandwidth of a communication channel. A time interval of 8 IEEE 802.15.4 symbol periods is used for the ED measurement. The specification provides that an energy detection scan obtains a measure of the "peak energy" for each requested communication channel from a plurality of ED measurements performed on the communication channel over a specified scan duration, by returning an energy value corresponding to the maximum ED measurement result during the scan period.

In this regard, the ZigBee specification provides a management network update request ("Mgmt_NWK_Update_req") which a PAN Coordinator can transmit to another wireless device (e.g., a Router) in the ZigBee wireless PAN, either directly or via a Router 120*b*.

Table 1 illustrates the format of the Mgmt_NWK_Update_req command in the ZigBee specification:

TABLE 1

| Octets: 4 | 1 | 4 | 2 |
|---|---|---|---|
| ScanChannels | ScanDuration | ActiveChannel | nwkManagerAddr |

In Table 1, the fields include:

ScanChannels specifies the communication channels for which the energy detection scan should be preformed;

ScanDuration specifies the duration for which each energy detection scan should be performed;

ActiveChannel is a subset of the ScanChannels parameter and represents a list of prospective channels on which to operate the PAN; and nwkManagerAddr specifies the NWK address for the device with the Network Manager bit set in its node descriptor.

In response to a management network update request issued by the PAN Coordinator, a wireless device performs a single ED scan for the specified scan period for each of the specified communication channels; stores energy values corresponding to the maximum energy detected during the scan period, and transmits a management network update response ("Mgmt_NWK_Update_rsp") message including the energy values.

Table 2 illustrates the format of the Mgmt_NWK_Update_rsp message in the ZigBee specification:

TABLE 2

| Octets: 1 | 4 | 1 | Variable |
|---|---|---|---|
| Status | ScannedChannels | ScannedChannelsListCount | EDandTXfailureList |

In Table 2:

Status specifies the status of the Mgmt_NWK_Update_rsp command (e.g., SUCCESS; INVALID REQUEST; NOT_SUPPORTED);

ScannedChannels is a list of channels scanned by the request;

ScannedChannelsListCount is a list containing the number of records contained in the EDandTXfailureList parameter; and EDandTXfailureList is a list of descriptors, one for each of the channels in the ScannedChannelsListCount, of the energy values and transmission failure report descriptors created as a result of the management network update request.

The above-described procedure suffers from several deficiencies.

In particular, there are several shortcomings to characterizing the availability of a communication channel based only upon energy values each corresponding to a maximum energy detected in a single energy detection scan. For example, some interfering devices may transmit data in an intermittent fashion, perhaps with a low duty cycle. In that case, the energy detection scan described above can lead to misleading results.

At the outset, if the energy detection scan is performed during a time period when an intermittently-interfering device is not transmitting, the energy value may be very low, indicating only the presence of background noise and not recognizing the presence of an intermittent interferer.

To address this problem, the scan period may be lengthened to try to ensure that intermittent transmissions are captured in the energy detection scan. However in that case, since the energy value produced in an energy detection scan reflects only the maximum energy detected over the scan period, it is not possible to know how much of the time (if any) the received power level may actually be much less than the maximum energy level. That is, if the energy detection scan is performed during a scan period when an intermittently-interfering device happens to be transmitting, the maximum energy may be very high, inaccurately indicating a total unavailability for the communication channel. However, in reality, if the duty cycle is low enough, such a communication channel may still be useable for certain types of communication where 100% channel availability is not required. So, no matter how the scan period may be adjusted, there is a problem in appropriately characterizing communication channels by using energy values each corresponding to a maximum energy detected in a single energy detection scan.

Furthermore, different ZigBee wireless devices may transmit different types of payload data with differing data rate requirements, different duty cycles, different latency requirements, etc. Accordingly, interference in a communication channel that might make the communication channel unsuitable for communication by one wireless device, might not present a major problem for communication by another wireless device with different data communication requirements. However, an energy value reflecting a maximum energy value measured from a single energy detection scan will not reveal such subtleties.

In general, a simple list of energy values for each communication channel corresponding to a maximum energy detected in a single energy detection scan does not provide a robust data set that facilitates optimal decisions for selecting communication channels.

Furthermore, although the problems described above have been illustrated with respect to details of a wireless device operating in a ZigBee PAN, in general problems may occur in other communication networks when only a single energy value is used to try to characterize the availability of a communication channel, even in networks where the energy value is not a maximum detected energy or is obtained from a single measurement rather than from a scan.

Accordingly, it would be desirable to provide a wireless device capable of gathering and reporting data concerning communication channel conditions for a wireless device in a wireless network that can overcome one or more of the above shortcomings. It would further be desirable to provide an improved method of gathering and reporting data concerning communication channel conditions for a wireless device in a wireless network.

In one aspect of the invention, a method is provided for reporting communication channel conditions for a wireless device adapted to operate in a wireless network. The method comprises: for each of one or more selected communication channels among a plurality of communication channels over which the wireless device is adapted to communicate, performing a plurality of energy detection scans to obtain a plurality of energy values each corresponding to a maximum energy detected in the corresponding communication channel during each energy detection scan period; for each of the selected communication channels, calculating at least one statistic from the energy values obtained in the plurality of energy detection scans; for each of the selected communication channels, determining at least one metric related to the communication channel's availability for communications, based on the at least one statistic; and reporting the at least one metric for each of the scanned communication channels to at least one other wireless device in the wireless network.

In another aspect of the invention, a method of operating a wireless device includes obtaining statistical data regarding each of one or more communication channels over which the wireless device is adapted to communicate, and reporting from the wireless device to at least one other wireless device at least one metric related to an availability of each of the one or more communications channels for communications.

In a further aspect of the invention, a wireless device adapted to communicate with at least one node in a wireless network, includes a transmitter; a receiver adapted to operate over a plurality of communication channels; an energy detector coupled to the receiver and adapted to perform an energy detection scan in a selected communication channel; and one or more processors. The processor(s) are configured to execute an algorithm, including: employing the energy detector to perform a plurality of energy detection scans for each of one or more selected communication channels among a plurality of communication channels over which the wireless device is adapted to communicate, to obtain a plurality of energy values each corresponding to a maximum energy detected in the corresponding communication channel during an energy detection scan period; for each of the selected communication channels, calculating at least one statistic from the energy values obtained in the plurality of energy detection scans; for each of the selected communication channels, determining at least one metric related to the communication channel's availability for communications, based on the at least one statistic; and providing to the transmitter for transmission the at least one metric for each of the selected communication channels.

In yet another aspect of the invention, a device is adapted to wirelessly communicate with at least one node in a wireless network. The device is adapted to obtain statistical data regarding each of one or more selected communication channels over which the wireless device is adapted to communicate, and to report from the wireless device to at least one other wireless device at least one metric related to an availability of each of the one or more selected communications channels for communications.

DETAILED DESCRIPTION

The present invention will now be described more fully hereinafter with reference to the accompanying drawing figures, in which preferred embodiments of the invention are shown. This invention may, however, be embodied in different forms and should not be construed as limited to the embodiments set forth herein. Rather, these embodiments are provided as teaching examples of the invention.

Figure 1:
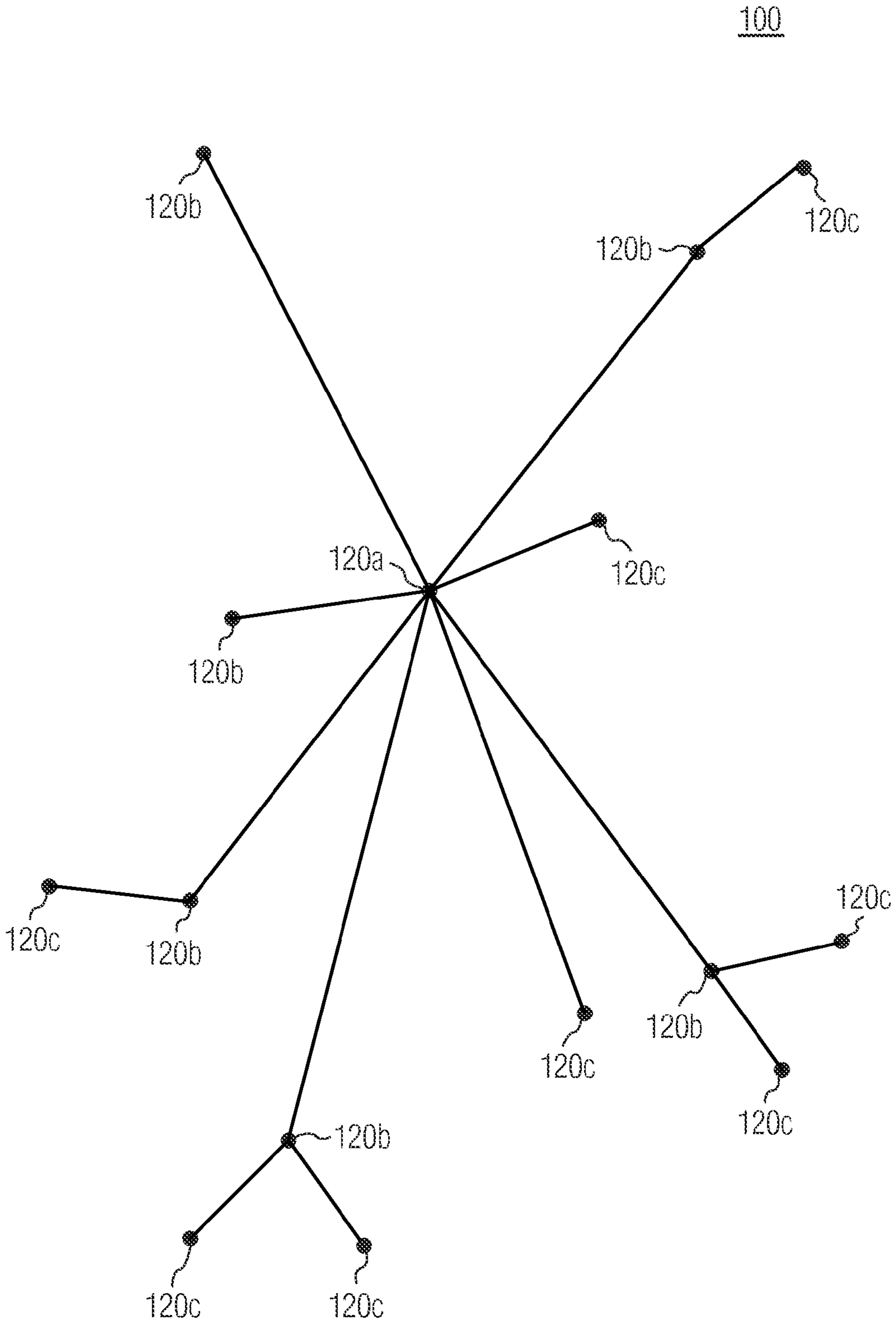
FIG. 1 shows one embodiment of a wireless network including a plurality of wireless devices.
Figure 2:
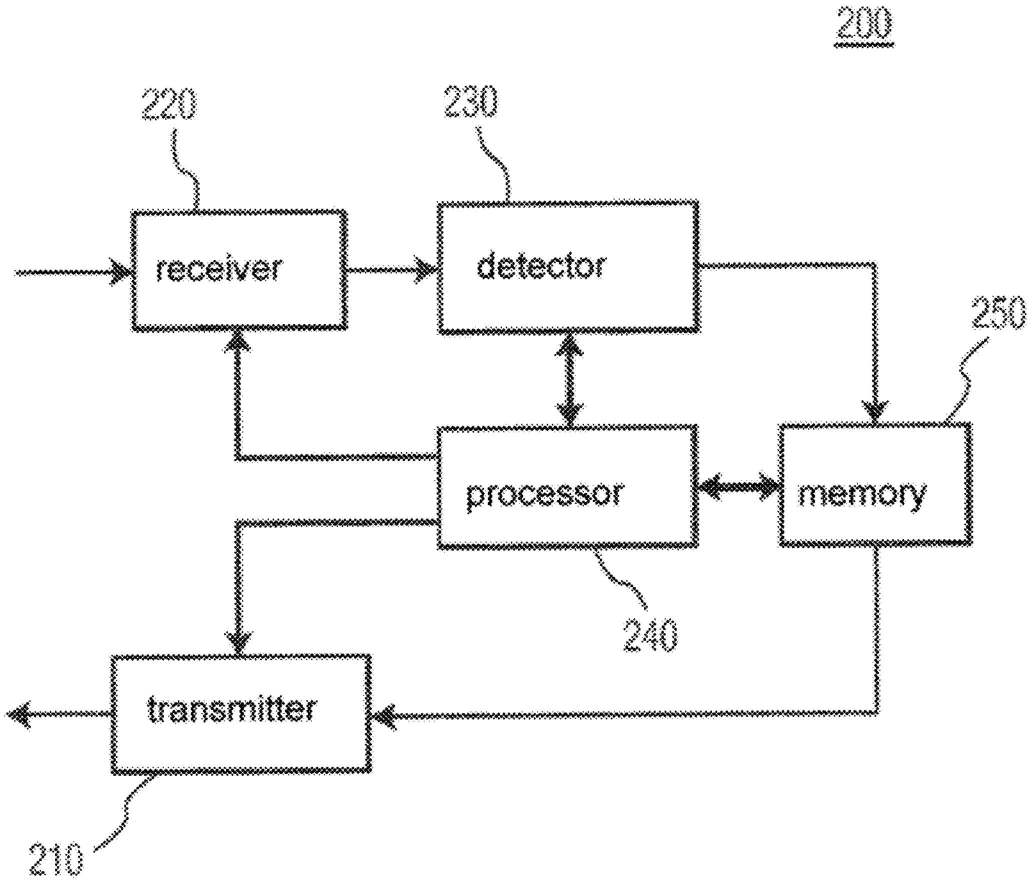
FIG. 2 shows a functional diagram of one embodiment of a wireless device.

FIG. 2 shows a functional diagram of one embodiment of a wireless device 200, which may be employed as a wireless device 120 in the wireless network 100 of FIG. 1. As will be appreciated by those skilled in the art, one or more of the various "parts" shown in FIG. 2 may be physically implemented using a software-controlled microprocessor, hard-wired logic circuits, or a combination thereof. Also, while the parts are functionally segregated in FIG. 2 for explanation purposes, they may be combined variously in any physical implementation.

Wireless device 200 includes transmitter 210, receiver 220, energy detector 230, processor 240, and memory 250. Processor 240 is configured to execute one or more software algorithms in conjunction with memory 250 to supply data to, to receive data from, and/or to control operations of transmitter 210, receiver 220, and/or energy detector 230. Beneficially, processor 240 includes its own memory (e.g., nonvolatile memory) for storing executable software code that allows it to control operations of transmitter 210, receiver 220, and/or energy detector 230. Alternatively, executable code may be stored in designated memory locations within memory 250. Also, although processor 240 is shown in FIG. 2 as a distinct element for illustration purposes, in an actual physical realization one or more processors or controllers may be embedded within transmitter 210, receiver 220, and/or energy detector 230 and may cooperate with each other to perform operations of wireless device 200, described below as performed by processor 240.

Wireless device 200 is adapted to communicate selectively in one or more of a plurality of communication channels, for example communication channels specified by the ZigBee specification in the 800/900 MHz band and the 2.4 GHz band. In this context, a communication channel comprises a defined portion of the frequency spectrum. In that case, receiver 220 may receive messages, which may include payload data, from other wireless devices over one or more selected communication channels in accordance with the protocols of the wireless network (e.g., a ZigBee wireless PAN). Similarly, transmitter 210 is adapted to transmit messages, which may include payload data, to other wireless devices in accordance with the protocols of the wireless network (e.g., a ZigBee wireless PAN). In some embodiments, wireless device 200 may operate as a Router which may relay messages or data from one wireless device to another wireless device, by receiving the messages or data from a first wireless device via receiver 220, and then retransmitting the messages or data to a second wireless device via transmitter 210.

Beneficially, wireless device 200 is adapted to gather data regarding the availability of the communication channels on which it is adapted to operate. Such data collection may be initiated in response to one or more messages received from another wireless device, for example a message originated by a PAN Coordinator in a wireless network in which wireless device 200 is operating. The message(s) may request that wireless device 200 conduct an assessment of local communication channel conditions. Furthermore, the message(s) may indicate one or more selected communication channels that are to be assessed. The data collection may be performed for all of the communication channels in which wireless device 200 is adapted to operate, or only over a selected subset of channels, perhaps even a single communication channel.

In wireless device 200, data regarding communication channel conditions for wireless device 200 can be gathered by tuning receiver 220 to a communication channel that has been selected to be surveyed, and then operating energy detector 230 to perform an energy measurement to detect the energy present in the communication channel during the measurement period.

In one embodiment, energy detector 230 is configured to perform an energy detection scan. In that case, the energy detection scan is a series of energy measurements performed over a predetermined scan period that returns an energy value corresponding to a maximum energy detected in the communication channel during the scan period. This embodiment may correspond to an energy detection scan performed in accordance with IEEE Standard 802.15.4-2003. However, in other arrangements, an energy detection scan may return a different energy value, such as an energy value corresponding to an average energy detected in the communication channel during the scan period. Furthermore, in some arrangements, an energy detection scan may return a plurality of energy values, for example, a minimum energy measurement, maximum energy measurement, and/or average energy measurement, or perhaps energy values reflecting each of the individual energy measurements.

This process may be repeated for all of the selected communication channels to be surveyed, thereby gathering data which may be employed to assess availability of the selected communication channels for data communications.

Beneficially, in one embodiment wireless device 200 is adapted to perform a plurality of energy detection scans for each of the communication channels being surveyed, and obtains an energy value for each communication channel for each scan period.

In this case, advantageously, in one embodiment, wireless device 200 may perform energy detection scans for all of the selected communication channels a first time, and then repeat the process so as to scan across all of the selected communication channels Ntimes to obtain N energy values for each of the selected communication channels (N≧2). In that case, processor 240 may control receiver 220 and energy detector 230 to tune to a first selected communication channel for a predetermined time period, obtain an energy value and store it in memory 250, tune to a second selected communication channel for a predetermined time period, obtain another energy value and store it in memory 250, etc. Processor 240 may perform such operations in accordance with one or more software algorithms stored in memory 250.

Alternatively, wireless device 200 may measure the energy in a first selected communication channel N times, obtaining an energy value for each of the N scan periods, and then tune to a second communication channel, perform N energy detection scans for the second channel, etc., repeating the process for all of the selected communication channels. In that case, processor 240 may control receiver 220 to tune to a first communication channel, and further control energy detector 230 to detect channel energy for a first predetermined time period, storing the detected energy value in memory 250. Then, while receiver 220 remains tuned to the same communication channel, the processor 240 may control energy detector 230 to detect channel energy for another predetermined time period, storing the detected energy value in memory 250. This may be repeated until N energy values are obtained, at which point processor 230 may tune receiver 220 to a next selected communication channel, and repeat the process. Processor 240 may perform such operations in accordance with one or more software algorithms stored in memory 250. Other arrangements are possible.

In any case, energy detection scans may be carried out quickly one after another, or with delays in between. The delay length may be selected pseudo randomly. Beneficially, having random delays between scans may minimize the likelihood of getting misleading results due to sampling with a periodicity related to the periodicity (of some multiple thereof) of an interferer.

Advantageously, energy detection scans for a communication channel may be performed with a sufficient delay between them such that the scans are substantially statistically independent with respect to one or all possible intermittent interfering transmitters.

Although N can be any integer, in practice good results are obtained for values of N where 3≦N≦10.

Beneficially, by performing a plurality of energy detection scans for each of the selected communication channels over different time periods, it is possible to obtain more accurate and robust information regarding the presence and nature of any interfering transmitters operating on any of the communication channels. For example, if an intermittent transmitter is operating in a particular communication channel, its presence may be more reliably detected if the energy in the channel is detected over a plurality of scan periods. In that case, one or more energy detection scans may yield relatively low energy value(s), reflecting mere background noise in the channel, while one or more other energy detection scans may yield much higher energy detection(s), thus indicating the presence of an intermittent transmitter. Furthermore, by observing the percentage of the energy detection scans where the energy values are elevated, the frequency and duration of intermittent transmissions may be estimated.

Beneficially, wireless device 200 may be adapted to calculate at least one statistic from the energy values obtained in the plurality of energy detection scans. Such calculations may be performed by processor 240 based on energy values stored in memory 250 from energy detection scans performed by energy detector 230, in accordance with one or more software algorithms stored in memory 250.

Table 3 lists some exemplary statistics that may be calculated by wireless device 200 for each selected communication channel from energy values obtained in a plurality (N) of energy detection scans for that communication channel.

TABLE 3

| |
|---|
| average energy value from N energy detection scans |
| minimum energy value from N energy detection scans |
| maximum energy value from N energy detection scans |
| an average of a lowest P energy values from N energy detection scans |
| an average energy value obtained by excluding an M highest energy values and a lowest P energy values from N energy detection scans |
| a difference between a maximum energy value and a minimum energy value from N energy detection scans |
| a percentage of the N energy detection scans where the energy value obtained was greater than (or greater than or equal to) a threshold value |
| a percentage of the N energy detection scans where the energy value obtained was less than (or less than or equal to) a threshold value |

Beneficially, the particular statistic(s) that are calculated are selected in view of the applications of the wireless device 200 and a typical environment in which it is expected to operate. For example, different wireless devices 200 may transmit different types of payload data with differing data rate requirements, different duty cycles, different latency requirements. Therefore, interference in a communication channel that might make the communication channel unsuitable for communication by one wireless device 200, might not present a major problem for communication by another wireless device 200 with different data communication requirements. Accordingly, wireless device 200 may be adapted to gather statistics that are particularly useful for determining the availability of the communication channel for communication, and/or to gather statistics for the communication channel's suitability for a variety of types of applications. Wireless device 200 may further be adapted to gather information about communication conditions for other nearby devices via the communication channel.

For example, as shown in Table 3, one statistic that may be calculated is a percentage of the N energy detection scans where the energy value obtained was less than a threshold value. In that case, the threshold value may be selected to correspond to an energy level $E_{TH}$ that is expected to be low enough that reliable communications with a neighboring wireless device may be achieved. So, for example, if 90% of the N energy detection scans on communication channel i produced energy values indicating a detected channel energy level less than $E_{TH}$, then it might be expected that a very high percentage of messages could reliability be communicated to and from wireless device 200 over communication channel i.

In many applications, such a message success rate may be more than acceptable and so even though an intermittent interfering transmitter may be operating in the channel, the channel may still be considered "available" for communication.

Also advantageously, for each of the scanned communication channels, wireless device 200 determines at least one metric related to the communication channel's availability for communications (for example by wireless device 200). Beneficially, processor 240 may determine one or more metrics based, at least in part, on the statistic(s) calculated from the energy values obtained during the energy detection scans by energy detector 230, in accordance with one or more software algorithms stored in memory 250. Indeed, in one embodiment, one or more of the metrics may be the same as the one or more statistics that are calculated by wireless device 200. In another embodiment, a metric could be determined based on the result of a single energy detection scan of each selected communication channel. However, in general, such an embodiment may not provide as useful and robust information as will be obtained in the favored case where multiple energy detection scans are performed for each communication channel. In still another embodiment, one or more metrics may be determined based on some combination of the statistic(s) calculated from the energy values obtained during the energy detection scans, together with one or more other values or statistics generally indicative of the communication availability of the communication channel. Such other values or statistics may include: a number or percentage of transmission failures (e.g., TX failures) observed by wireless device 200 during previous communication attempts with one or more other wireless devices using the communication channel; Received Signal Strength Indication (RSSI) values; Link Quality Index (LQI) values; etc.

Table 4 lists some exemplary metrics that can be determined by wireless device 200 related to a channel's communication availability for communications.

TABLE 4

| |
|---|
| a probability of receiving an arbitrary message from another wireless device over the communication channel |
| a binary value identifying whether or not the channel is determined to be suitable for communications |
| a numerical value in a channel availability scale identifying an availability of the channel for communications |
| identifier indicating one or more of a plurality of enumerated scenarios for channel usage for which the communication channel is deemed to be available |
| a cost number indicating the estimated availability of the communication channel for communications |
| a calculated statistic, such as those statistics shown in Table 3 |

As indicated in Table 4, one possible metric may be a numerical value identifying the availability of the channel for communications by wireless device 200. For example, a scale from 0-7 may be provided, with a "0" corresponding to a communication channel which appears to be excellent for communication, and a "7" corresponding to a channel which appears to be totally unavailable for communications. In that case, the wireless device may use statistic(s) calculated from energy values, and/or other values or statistics generally indicative of the communication availability of the communication channel as described above, to determine the availability of the communication channel for communications, and to assign a corresponding numerical value from 0 to 7.

In a simpler arrangement, wireless device 200 may make a simple "go/no-go" assessment of a communication channel based on the statistic(s) calculated from energy values, and/or a transmission failure values for the communication value. In that case, wireless device 200 may assign a binary value to each communication channel indicating whether or not it is deemed to be available for communications.

In another arrangement, a plurality of different communication scenarios may be defined relating to the availability of a communication channel for different types of devices or data transmissions. These scenarios may be defined in terms of: transmission data rate requirements; transmission latency requirements; transmission frequency (e.g., continuously; occasionally; or rarely); the type of data being transmitted (e.g., control data; audio/video data (where supported by the network standard); environmental data; etc.); data security levels; class of wireless device that may perform the communications; etc. Each scenario may have associated therewith as a metric an identifier, for example a numerical value in table. In that case, wireless device 200 may assign one or more of these identifiers to each selected communication channel based on statistic(s) calculated from energy values, and/or a transmission failure value for the communication channel.

Meanwhile, the ZigBee routing algorithm, for example, uses a path cost metric for route comparison during route discovery and maintenance. In order to compute this metric, a cost, known as the link cost, is associated with each link in the path, and link cost values are summed to produce the cost for the path as a whole. Accordingly, in still another arrangement, wireless receiver 200 may assign a cost to each selected communication channel as an indication of the estimated availability of the communication channel for communications. In that case, for example, a PAN Coordinator may use the costs reported by some or all wireless devices 200 in its network in an algorithm to determine one or more communication channels on which to operate. For example, in a simple case the PAN coordinator may simply sum the costs reported from some or all of the wireless devices 200 and select a communication channel or channels having the lowest total cost(s). Of course, other arrangements are possible.

After determining one or more metrics regarding each of the selected communication channels that were scanned, wireless device 200 can report the metric(s) for each of the scanned communication channels to at least one other wireless device in the wireless network, beneficially the PAN Coordinator or a Router that can forward the metric(s) on to the PAN Coordinator. Wireless device 200 may communicate or report the metrics in a message having a specific format (e.g., a Mgmt_NWK_Update_rsp message), examples of which will be described below. In one embodiment, wireless device 200 may include other information in the message, specifically including a TX Failure value indicating a number or percentage of transmission failures observed by wireless device 200 during previous communication attempts with one or more other wireless devices using the communication channel. Thus the PAN Coordinator can obtain metrics from one or all wireless devices in the wireless network, and thereby make intelligent decisions regarding the channel(s) on which the network should operate.

Figure 3:
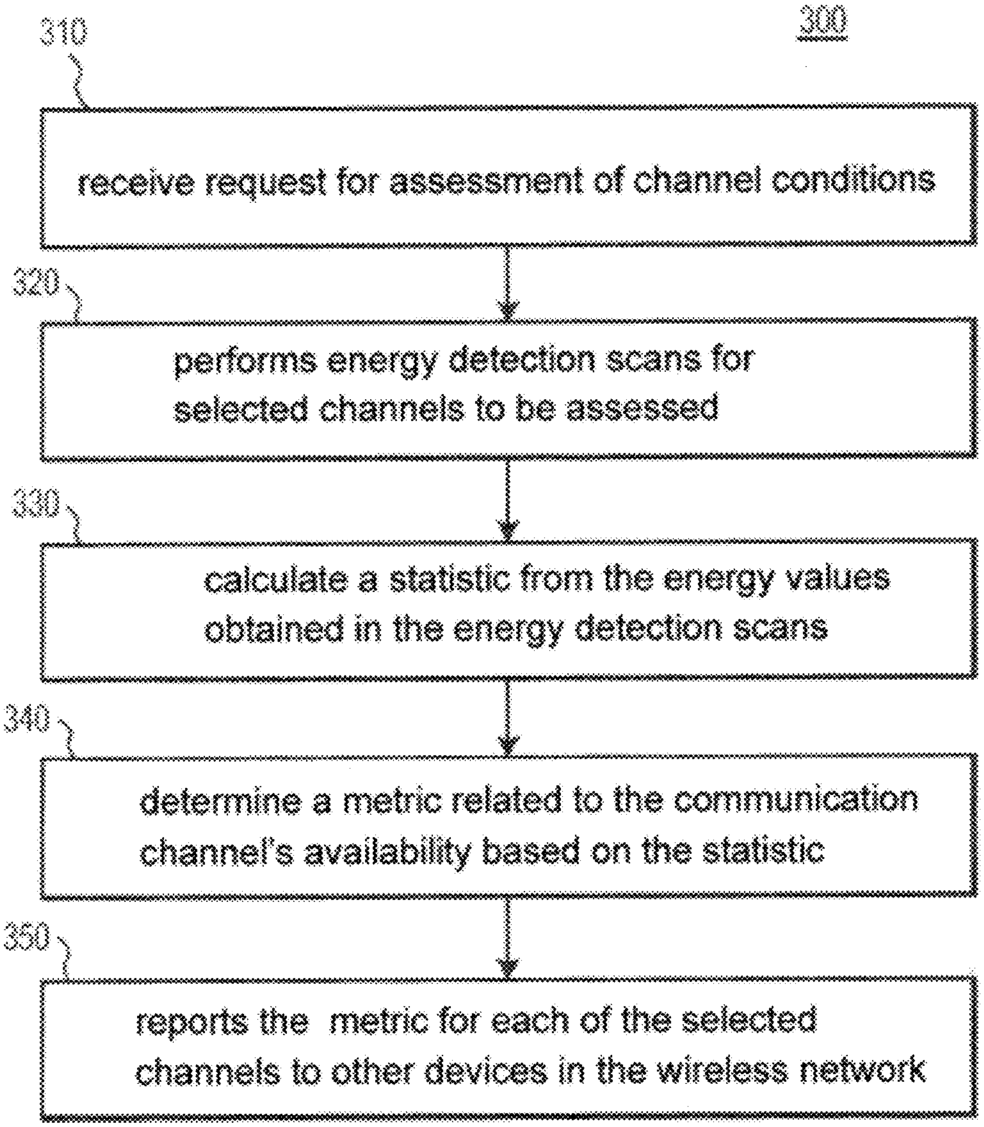
FIG. 3 shows a flowchart of one embodiment of a method of gathering and reporting data concerning communication channel conditions for a wireless device in a wireless network.

FIG. 3 shows a flowchart of one embodiment of a method 300 of gathering and reporting data concerning communication channel conditions for a wireless device, such as wireless device 200, in a wireless network.

In a first step 310, a wireless device receives one or more messages requesting that the wireless device conduct an assessment of communication channel conditions for the wireless device based on detected energy within the communication channel(s). The message(s) may request that the assessment be performed for all of the communication channels in which the wireless device is adapted to operate, or only over a subset of channels, including perhaps a single communication channel. Such message(s) may originate from a PAN Coordinator for a wireless network in which the wireless device operates. In the case of a ZigBee wireless PAN, the request may be in the form of a Mgmt_NWK_Update_req message.

Beneficially, the message(s) received by the wireless device may include one more of the following: (1) a list of one or more communication channels that are to be scanned; (2) an indication of one or more statistics to be calculated by the wireless receiver; and (3) an indication of one or more metrics to be reported by the wireless device.

In one embodiment, a wireless device also, or instead, may be configured to assess communication channel conditions for the wireless device without receiving any requests. For example, a processor in the wireless device may be configured to conduct an assessment of communication channel conditions at fixed, or random, time intervals.

In a step 320, the wireless device performs a plurality (N) of energy detection scans for each of one or more selected communication channels to be assessed, to obtain a plurality of energy values, one for each energy detection scan. Beneficially, each energy value reflects a maximum energy detected during the energy detection scan.

In a step 330, for each of the selected communication channels, the wireless device calculates at least one statistic from the energy values obtained in the plurality of energy detection scans. An exemplary, but non-limiting, list of such statistics is shown in Table 3 above.

In a step 340, for each of the selected communication channels, the wireless device determines at least one metric related to the communication channel's availability for communications, based on the at least one statistic. An exemplary, but non-limiting, list of such metrics is shown in Table 4 above.

Then, in a step 350, the wireless device reports at least one metric for each of the selected communication channels to at least one other wireless device in the wireless network. The wireless device may communicate or report the metrics in one or more messages (e.g., a Mgmt_NWK_Update_rsp message).

Table 5 shows one embodiment of a payload format of a network environment status message transmitted by a wireless device, such as wireless device 200 shown in FIG. 2. The payload format illustrated in Table 5 includes three fields for the wireless device to report three metrics for each scanned communication channel, each of the metrics (maximum, minimum, and average values) corresponding to a statistic calculated from the N energy values obtained during the plurality of energy detection scans.

TABLE 5

| Octets: 1 | 4 | 1 | Variable | Variable | Variable |
|---|---|---|---|---|---|
| Status | Scanned channels | Scanned channels list count | Set of Maximum values received from N energy scans | Set of Average values received from N energy scans | Set of Minimum values received from N energy scans |

Table 6 shows a second embodiment of a payload format of a network environment status message from a wireless device. In the embodiment of Table 6, the payload includes a plurality of cost values assigned by wireless device 200 each indicating an estimated availability of communications using the corresponding communication channel, as discussed in greater detail above.

TABLE 6

| Octets: 1 | 4 | 1 | Variable |
|---|---|---|---|
| Status | Scanned Channels | Scanned channels list count | Set of cost numbers each indicating an estimated availability of communications using the corresponding communication channel |

Table 7 shows a third embodiment of a payload format of a network environment status message from a wireless device. For additional flexibility, a wireless device and a PAN Coordinator, for example, may have a table of predefined metrics which assigns an identifier to each of the predefined metrics. In that case, the wireless device may utilize the payload format illustrated in Table 6, which includes a field to provide an identifier of the metric that is being reported.

TABLE 7

| Octets: 1 | 4 | 1 | 1 | 1 | Variable |
|---|---|---|---|---|---|
| Status | Scanned channels | Scanned channels list count | Information type (eg: indicates minimum values included) | Length | Set of values (eg: minimum values received from N energy scans) |

Table 8 shows a fourth embodiment of a payload format of a network environment status message from a wireless device. The payload format of Table 8 includes fields for a wireless device to indicate a plurality of metric types that are being reported, together with their corresponding field lengths.

TABLE 8

| Octets: 1 | 4 | 1 | 1 | 1 | Variable | 1 | 1 | Variable |
|---|---|---|---|---|---|---|---|---|
| Status | Scanned channels | Scanned channels list count | Information type 1 | Length 1 | Set of values 1 | Information type 2 | Length 2 | Set of values 2 |

Table 9 shows a fifth embodiment of a payload format of a network environment status message from a wireless device. The format of Table 9 includes a variable-length field for reporting a metric based on the energy values obtained during the energy detection scans for each communication channel, together with transmission failure count or percentage data observed by the wireless device during previous communication attempts with one or more other wireless devices using the communication channel.

TABLE 9

| Octets: 1 | 4 | 1 | Variable |
|---|---|---|---|
| Status | Scanned channels | Scanned channels list count | ED and TX failure list record format, consisting of 1 byte ED scan result followed by 2 bytes TX failure count for each channel. |

Of course although Tables 5-9 each illustrate beneficial features for a message transmitted by a wireless device to report conditions on a plurality of communication channels, it should be understood that these tables are exemplary and not limiting, and other payload data formats are envisioned.

While preferred embodiments are disclosed herein, many variations are possible which remain within the concept and scope of the invention. Such variations would become clear to one of ordinary skill in the art after inspection of the specification, drawings and claims herein. For clarity and concreteness of explanation, examples have been provided above in the context of a ZigBee wireless PAN, and IEEE Standard 802.15.4-2003. However, while the features disclosed above have particular benefit and efficacy in the context of a ZigBee wireless PAN, it should be understood that the principles are expansive and can be applied appropriately in a variety of wireless networks, using a variety of lower layer specifications and standards. Such applications would be well understood by one of skill in the art upon review of the specification and drawings of this application. The invention therefore is not to be restricted except within the scope of the appended claims.

What is claimed is:

1. A method of reporting communication channel conditions for a wireless device adapted to operate in a wireless network, the method comprising the acts of:

for each of one or more selected communication channels among a plurality of communication channels over which the wireless device is adapted to communicate, performing a plurality of energy detection scans to obtain a plurality of energy values each corresponding to a maximum energy detected in the corresponding communication channel during an energy detection period;

for each of the selected communication channels, calculating at least one statistic from the energy values obtained in the plurality of energy detection scans;

for each of the selected communication channels, determining at least one metric related to the communication channel's availability for communications, based on the at least one statistic; and reporting the at least one metric for each of the selected communication channels to at least one other wireless device in the wireless network, wherein the at least one statistic includes at least one selected from the group consisting of:

an average of a lowest P energy values obtained in the plurality of energy detection scans;

an average energy value obtained by excluding an M highest energy values and a lowest P energy values obtained in the plurality of energy detection scans;

a difference between a maximum energy value and a minimum energy value obtained in the plurality of energy detection scans;

a percentage of the energy detection scans where the energy value obtained was greater than a threshold value; and a percentage of the energy detection scans where the energy value obtained was less than a threshold value.

2. The method of claim 1, further comprising receiving at the wireless device one or more messages requesting that the wireless device conduct an assessment of communication channel conditions for the wireless device.

3. The method of claim 2, wherein the one or more messages indicate the one or more communication channels that are to be selected.

4. The method of claim 2, wherein the one or more messages indicate the one or more statistics to be calculated.

5. The method of claim 2, wherein the one or more messages indicate the metric to be reported by the wireless device.

6. The method of claim 1, wherein the at least one metric is the same as at least one calculated statistic.

7. The method of claim 1, wherein the at least one statistic is the minimum energy value obtained in the plurality of energy detection scans.

8. The method of claim 1, wherein the at least one statistic is the average energy value obtained in the plurality of energy detection scans.

9. The method of claim 1, wherein the at least one statistic is the maximum energy value obtained in the plurality of energy detection scans.

10. The method of claim 1, wherein the at least one metric is an indication of the probability of receiving an arbitrary message from another wireless device over the communication channel.

11. The method of claim 1, wherein the at least one metric is a binary value identifying whether or not the communication channel is determined to be available for communications.

12. The method of claim 1, wherein the at least one metric is a numerical value in a channel availability scale identifying an availability of the communication channel for communications.

13. The method of claim 1, wherein the at least one metric identifies one of a plurality of enumerated scenarios for usage of the communication channel.

14. The method of claim 13, wherein the enumerated scenarios include at least one scenario indicating availability of the communication channel only for only occasional use.

15. The method of claim 13, wherein the enumerated scenarios include an indication of a type of data that can be communicated over the communication channel.

16. The method of claim 1, wherein the at least one metric is a cost number indicating an estimated availability of the corresponding communication channel for communications.

17. The method of claim 1, further including communicating to the at least one other wireless device an indication of the at least one metric being reported among a plurality of possible metrics that could be reported.

18. The method of claim 1, including the calculation of a plurality of statistics from the energy values obtained in the plurality of energy detection scans.

19. The method of claim 1, wherein the wireless device reports a plurality of metrics related to the communication channel's availability for communications.

20. The method of claim 1, wherein a pseudo randomly selected delay is provided between energy detection scans for each communication channel.

21. A method of operating a wireless device, comprising performing a plurality of energy detection scans to obtain a plurality of energy values each corresponding to a maximum energy detected in the corresponding communication channel during an energy detection period and, from the plurality of energy values, obtaining statistical data regarding each of one or more selected communication channels over which the wireless device is adapted to communicate, and reporting from the wireless device to at least one other wireless device at least one metric related to an availability of each of the one or more selected communication channels for communications based on the statistical data, wherein the statistical data includes at least one selected from the group consisting of:

an average of a lowest P energy values obtained in the plurality of energy detection scans;

an average energy value obtained by excluding an M highest energy values and a lowest P energy values obtained in the plurality of energy detection scans;

a difference between a maximum energy value and a minimum energy value obtained in the plurality of energy detection scans;

a percentage of the energy detection scans where the energy value obtained was greater than a threshold value; and a percentage of the energy detection scans where the energy value obtained was less than a threshold value.

22. The method of claim 21, wherein the statistical data and the at least one metric are each obtained from a single energy detection scan for the corresponding communication channel.

23. The method of claim 21, wherein the at least one metric is an indication of a probability of receiving an arbitrary message from another wireless device over the communication channel.

24. The method of claim 21, wherein the at least one metric is a binary value identifying whether or not the communication channel is determined to be available for communications.

25. The method of claim 21, wherein the at least one metric is a numerical value in a channel availability scale identifying an availability of the communication channel for communications.

26. The method of claim 21, wherein the at least one metric identifies one of a plurality of enumerated scenarios for channel usage.

27. The method of claim 26, wherein the enumerated scenarios include at least one scenario indicating availability of the communication channel for only occasional use.

28. The method of claim 26, wherein the enumerated scenarios include an indication of a type of data that can be communicated over the communication channel.

29. The method of claim 21, wherein the at least one metric is a cost number indicating an estimated availability of the corresponding communication channel for communications.

30. The method of claim 21, further including communicating to the at least one other wireless device an indication of the at least one metric being reported among a plurality of possible metrics that could be reported.

31. A device adapted to communicate with at least one node in a wireless network, the device comprising:

a transmitter;

a receiver adapted to operate over a plurality of communication channels;

an energy detector coupled to the receiver and adapted to perform an energy detection scan in a selected communication channel; and one or more processors configured to execute an algorithm, including:

employing the energy detector to perform a plurality of energy detection scans for each of one or more selected communication channels among a plurality communication channels over which the device is adapted to communicate, to obtain an energy value corresponding to a maximum energy detected in the corresponding communication channel during an energy detection period;

for each of the selected communication channels, calculating at least one statistic from the energy values obtained in the plurality of energy detection scans;

for each of the selected communication channels, determining at least one metric related to the communication channel's availability for communications, based on the at least one statistic; and providing to the transmitter for transmission, the at least one metric for each of the selected communication channels, wherein the at least one statistic includes at least one selected from the group consisting of:

an average of a lowest P energy values obtained in the plurality of energy detection scans;

an average energy value obtained by excluding an M highest energy values and a lowest P energy values obtained in the plurality of energy detection scans;

a difference between a maximum energy value and a minimum energy value obtained in the plurality of energy detection scans;

a percentage of the energy detection scans where the energy value obtained was greater than a threshold value; and a percentage of the energy detection scans where the energy value obtained was less than a threshold value.

32. The device of claim 31, wherein at least one metric is the same as at least one calculated statistic.

33. The device of claim 31, wherein the at least one statistic is the minimum energy value obtained in the plurality of energy detection scans.

34. The device of claim 31, wherein the at least one statistic is the average energy value obtained in the plurality of energy detection scans.

35. The device of claim 31, wherein the at least one statistic is the maximum energy value obtained in the plurality of energy detection scans.

36. The device of claim 31, wherein the at least one metric is an indication of a probability of receiving an arbitrary message from another device over the communication channel.

37. The device of claim 31, wherein the at least one metric is a binary value identifying whether or not the communication channel is determined to be available for communications.

38. The device of claim 31, wherein the at least one metric is a numerical value in a channel availability scale identifying an availability of the communication channel for communications.

39. The device of claim 31, wherein the metric is a value corresponding to one of a plurality of enumerated scenarios for usage of the communication channel.

40. The device of claim 39, wherein the enumerated scenarios include at least one scenario indicating availability of the communication channel for only occasional use.

41. The device of claim 39, wherein the enumerated scenarios include an indication of a type of data to be communicated over the communication channel.

42. The device of claim 31, wherein the algorithm further includes providing to the transmitter for transmission, an indication of the at least one metric being reported among a plurality of possible metrics that could be reported.

43. The device of claim 31, wherein the algorithm includes calculating a plurality of statistics from the energy values obtained in the plurality of energy detection scans.

44. The device of claim 31, wherein the device reports a plurality of metrics related to the communication channel's availability.

45. The device of claim 31, wherein the at least one metric is a cost number indicating an estimated availability of the corresponding communication channel for communications.

46. The device of claim 31, wherein a pseudo randomly selected delay is provided between energy detection scans for each communication channel.

47. A device adapted to wirelessly communicate with at least one node in a wireless network, wherein the device is adapted to perform a plurality of energy detection scans to obtain a plurality of energy values each corresponding to a maximum energy detected in the corresponding communication channel during an energy detection period and, from the plurality of energy values, obtain statistical data regarding each of one or more selected communication channels over which the device is adapted to communicate, and to report from the device to at least one other device at least one metric related to an availability of each of the one or more selected communication channels for communications based on the statistical data, wherein the statistical data includes at least one selected from the group consisting of:

- an average of a lowest P energy values obtained in the plurality of energy detection scans;
- an average energy value obtained by excluding an M highest energy values and a lowest P energy values obtained in the plurality of energy detection scans;
- a difference between a maximum energy value and a minimum energy value obtained in the plurality of energy detection scans;
- a percentage of the energy detection scans where the energy value obtained was greater than a threshold value; and
- a percentage of the energy detection scans where the energy value obtained was less than a threshold value.

48. The device of claim 47, wherein the device is adapted to perform an energy detection scan over each of the one or more selected communication channels, and wherein the statistical data and the at least one metric are each obtained from a single energy detection scan for the corresponding communication channel.

49. The device of claim 47, wherein the at least one metric is an indication of a probability of receiving an arbitrary message from another device over the communication channel.

50. The device of claim 47, wherein the at least one metric is a binary value identifying whether or not the communication channel is determined to be available for communications.

51. The device of claim 47, wherein the at least one metric is a numerical value in a channel availability scale identifying an availability of the communication channel for communications.

52. The device of claim 47, wherein the at least one metric identifies one of a plurality of enumerated scenarios for channel usage.

53. The device of claim 52, wherein the enumerated scenarios include at least one scenario indicating availability of the communication channel for only occasional use.

54. The device of claim 52, wherein the enumerated scenarios include an indication of a type of data that can be communicated over the communication channel.

55. The device of claim 47, wherein the at least one metric is a cost number indicating an estimated availability of the corresponding communication channel for communications.

56. The device of claim 47, wherein the device is further adapted to communicate to the at least one other device an indication of the at least one metric being reported among a plurality of possible metrics that could be reported.

* * * * *